United States Patent Office 3,542,695
Patented Nov. 24, 1970

3,542,695
PREPARATION OF POLYMERIZATION CATALYST BY REACTING DODECA - 2,6,10 - TRIENE-1,12 DIYL NICKEL, TRIFLUOROACETIC ACID AND OXYGEN
François Dawans, Bougival, Jean Pierre Durand, Rueil-Malmaison, and Philippe Teyssie, Le Vesinet, France, assignors to Institut Francais du Petrole des Carburants et Lubrifiants, Rueil-Malmaison, France
No Drawing. Filed Apr. 11, 1968, Ser. No. 720,467
Claims priority, application France, Apr. 13, 1967, 102,671; Sept. 15, 1967, 121,277
Int. Cl. C08d 1/22
U.S. Cl. 252—431                                    23 Claims

ABSTRACT OF THE DISCLOSURE

A polymerization catalyst is manufactured by treating a zero-valent nickel compound, such as dodeca 2,6,10-triene-1,12 diyl nickel (trimer of butadiene) with molecular oxygen either before or during the reaction of the nickel compound with trifluoroacetic acid. The molecular oxygen may be added to the nickel compound in molar ratio from about 0.05 to 0.9 gram molecules of oxygen per gram atom of nickel, while the molar ratio of trifluoroacetic acid to the nickel compound may be from about 0.5 to 50.

---

This invention relates to an improvement in the manufacture of a catalytic system for converting butadiene to stereo-regular polymers of high molecular weights, having, for instance, an intrinsic viscosity, measured in benzene at 30° C., higher than 1 dl./g., and whose structure exhibits essentially a cis-1,4 linkage to the extent of at least 90% and more often at least 95% of the polymer constituting units.

The catalytic system to which the improvement according to this invention can be applied, results from the reaction of a zerovalent nickel compound with trifluoroacetic acid.

The improvement according to this invention consists of reacting dodeca 2,6,10-triene-1, 12-diyl nickel (trimer of butadiene) with a controlled amount of molecular oxygen before or during the reaction of said compound with trifluoroacetic acid.

According to a preferred embodiment of the invention the nickel compound is caused to react with oxygen and the residual oxygen is removed either by lowering the pressure or by scavenging with an inert gas. Trifluoroacetic acid is thereafter caused to react and the unreacted acid is eliminated, thereby providing a catalyst for converting butadiene to a polybutadiene containing more than 95% of cis-1,4 units.

The improved manufacture of the catalytic species according to the invention depends on the respective proportions of oxygen to be added with respect to the nickel compound; there may be advantageously used a molar ratio (gram molecules of $O_2$/gram atoms of Ni) $O_2$/Ni, lower than 2 and preferably comprised between 0.05 and 0.9, the optimal ratio being in the range of from 0.4 to 0.6.

The reaction of oxygen with the nickel derivative may be carried out either with or without solvent, at a temperature usually comprised between —60° C. and +80° C., but preferably at the ambient temperature of about 20° C.; this reaction being rather rapid, the time of contact of the nickel compound may be very short and preferably comprised between 5 and 60 minutes.

Besides the favorable action of oxygen on the yields, during the manufacture of the polymerization catalyst, this additive makes easier the carrying out of the operation and accordingly results in more easily obtaining the catalytic species, with a higher degree of purity; in fact, the operations conducted in the absence of oxygen generally result in an oily species at the ordinary temperature, from which it is difficult to remove the unreacted constituents, as well as the compounds liberated during the reaction. The disadvantages of using catalytic species contaminated by such compounds for initiating the stereospecific polymerization of butadiene are well known (decrease of the catalyst activity, of the cis-1,4 units content and of the molecular weight of the polymer obtained and a wider molecular weight distribution). The addition of controlled amounts of oxygen, during the preparation of the catalyst composition appears to be of high interest since it results in direct formation of solid catalysts, which may be easily separated by precipitation followed by filtration and purified by successive washings with suitable solvents.

The addition of controlled amounts of oxygen during the preparation of the catalytic system results in a significant improvement in the conversion to solid catalyst, while maintaining constant the characteristics of the catalytic system: in fact, the chemical composition and the infra-red spectrum of the solids obtained respectively in the presence and in the absence of oxygen, are identical; as well as their activity and their stereospecificity for the cis-1,4 polymerization of butadiene.

This observation is the more unexpected since oxygen is known as having a noxious effect on stereospecific polymerizations in the presence of derivatives of transition metals, and more particularly such compounds are known to undergo modifications in the presence of traces of oxygen.

The dodeca-2,6,10-triene-1,12-diyl nickel may be prepared for instance by reacting butadiene with nickel complexes such as:

bis allyl nickel
bis cyclooctadiene nickel
cyclododecatriene (1,5,9) nickel
cyclooctatetraene nickel For the preparation of the catalytic species to which is to be applied the treatment according to the invention, the respective proportions of dodeca-2,6,10 triene-1,12-diyl nickel and trifluoroacetic acid may vary within wide limits; there may be used a molar ratio of trifluoroacetic acid to the nickel derivative comprised between 0.5 and 50 and for instance between 2 and 15, the optimal proportion being in the range of from 1 to 4. It is however essential to remove, for instance by distillation or washing, the unreacted trifluoroacetic acid before carrying out the step of polymerizing butadiene.

The method of preparation of the catalytic species is, in fact, of high importance. When there is admixed, into a reactor, with a suitable solvent such as heptane, the catalyst components i.e. the nickel derivative, the oxygen and the trifluoroacetic acid, and butadiene is added thereafter without preliminary separation of the active species from the free oxygen and trifluoroacetic acid, it is observed, after a reaction period of about ten hours, a certain amount of polymer, having an intrinsic viscosity (measured in toluene at 30° C.) of less than 0.7, and containing at most 90% of cis-1,4 structure, the remainder being composed of trans-1,4 units or vinyl 1,2 units are obtained. In order to obtain a polymer of intrinsic viscosity of at least 1, containing at least 90% of cis 1,4 units, it is convenient to proceed according to one of the following methods:

In a first stage dodeca -2,6,10-triene-1,12-diyl nickel, preliminarily treated with oxygen and used as such or dissolved in an inert hydrocarbon solvent, is caused to react with trifluoroacetic acid. Then, during a second stage, the excess of unreacted trifluoroacetic acid is evaporated, preferably under vacuum or removed by successive washings with a solvent such as a hydrocarbon, for instance benzene or normal heptane.

The residue as such or suspended in heptane or another inert hydrocarbon or dissolved in a solvent such as diethyl ether, will constitute the catalytic species for polymerizing butadiene to an elastomer of high molecular weight which is highly stereoregular. This residue may be in the form of a powder or an oil and may be stored over a long period without losing its catalytic properties.

The proportion of catalytic complex used for carrying out polymerization may be selected as a function of the desired reaction velocity and the molecular weight of the desired polymer. It may be very low, for instance of from 0.001 atom of nickel (in the form of complex) up to 2 atoms per 100 moles of monomer, these preferred proportions providing for the maximal stereospecificity.

According to a second method, there are admixed in any order, dodeca-2,6,10-triene-1,12-diyl nickel, oxygen and trifluoroacetic acid.

According to a third method the nickel derivative is prepared in situ and caused to react with oxygen and trifluoroacetic acid. Accordingly, a zerovalent nickel compound, preferably nickel bis-cyclooctadiene, is admixed with butadiene, used in a molar proportion, with respect to the nickel compound, of from 3 to 20, preferably between 8 and 15. The use of a higher proportion results in an undesirable conversion of butadiene to a polybutadiene which does not comply with the characteristics of the polymer according to the invention. Thereafter oxygen and trifluoroacetic acid are added either simultaneously or successively and the procedure is the same as hereabove described.

The preparation of the catalyst according to the one of the above-stated operating methods, may be conducted at a temperature comprised for instance between $-40°$ C. and $+120°$ C. and preferably between $-10$ and $+55°$ C.

The polymerization may be carried out with or without solvent, at a temperature generally between $-40°$ and $+120°$ C., the pressure being kept sufficient to maintain butadiene in the liquid phase; however, in order to obtain the maximal stereoregularity, the preferred temperature range will be of from $-16°$ C. to $+55°$ C.

The solvents used either for the manufacture of the catalyst or for the polymerization, may be advantageously selected from the inert hydrocarbons, particularly saturated aliphatic or cycloaliphatic hydrocarbons, with the exception of the polar solvents which tend to favor the formation of trans-1,4 units.

The catalytic system according to this invention is compatible with usual additives such as chain-regulating agents commonly used with coordination catalysts. The polymerization process may be carried out in a continuous manner or by separate charges with introduction of butadiene in a reactor with the catalytic system and the diluent.

The microstructure of the polybutadienes obtained has been determined by infrared spectrophotometry according to the method of D. Morero, A. Santambrogrio, L. Porri and F. Ciampelli (La Chimia e l'industria: XLI, eight 1959).

It is remarkable that the catalytic complex formed with trifluoroacetic acid leads to polybutadienes of high stereospecificity and high molecular weight with a high reaction velocity and the absence of gel. The same operating method but with replacement of trifluoroacetic acid by other halogenated derivatives of acetic acid does not provide polybutadienes with so high reaction velocities, the acetic acid leading to a completely inactive complex in the polymerizing conditions according to the invention.

The following examples 1 to 4 give non-limitative illustrations of the various above-mentioned statements (examples 1A and 1B being excluded from the scope of this invention).

EXAMPLE 1

To 50 cc. of a solution of 0.2 mole of nickel (dodeca-2,6,10-triene-1,12-diyl) per liter of normal heptane, are added 120 cc. of gaseous oxygen; after stirring for 15 minutes at ambient temperature, the eventual excess of oxygen is removed under reduced pressure and the residual product is caused to react with 4.5 g. of trifluoroacetic acid, for one hour at 40° C.; after removal, under reduced pressure (1 mm. Hg, 30–40° C.) of the acid excess and the solvent, the solid residue is washed with benzene until the washing liquid remains colorless, and then dried under vaccum. By this way, there are obtained 2 g. of a brown-yellow colored powder of constant composition which constitutes the catalytic species for stereospecific polymerization of butadiene.

When adding to 0.7 g. of said powder, 26 g. of butadiene and 100 cc. of normal heptane, there are obtained, after stirring for 15 minutes at 55° C., 16 g. of polybutadiene whose intrinsic viscosity, measured at 30° C. in toluene, is equal to 2 dl./g. and whose microstructure is composed of 97% of cis-1,4 units, 1% of trans-1,4 units and 2% of vinyl units.

Equivalent results are obtained where using 17.1 g. of trifluoroacetic acid in lieu of the 4.5 g. used in this example.

EXAMPLE 1A

By way of comparison, if, anything else being unchanged, oxygen is not added, there is formed an oil which, after washing with benzene and drying under vacuum, finally yields 1 g. of solid catalytic composition exhibiting a catalytic activity for polymerization of cis-1,4-butadiene which is similar to that of the powder obtained in Example 1.

EXAMPLE 1B

When, in Example 1, there are used 240 cc. of gaseous oxygen, conditions being otherwise unchanged, it is observed that the so-obtained reaction product is inactive to initiate the stereospecific polymerization of butadiene under experimental conditions similar to those of Example 1.

EXAMPLE 2

When, in Example 1, oxygen is added after the nickel derivative was caused to react with the trifluoroacetic acid, anything being otherwise unchanged, there can be finally obtained 2 g. of a solid compound exhibiting the same catalytic properties as those of the catalytic compositions obtained according to Examples 1 and 1A.

EXAMPLE 3

When, in Example 1, there are used 100 cc. of gaseous oxygen, everything being otherwise unchanged, there is obtained, at the end of the treatment, a solid compound which is dissolved in 20 cc. of diethyl ether and constitutes the solution A, so titrated as to know the equivalent in nickel milliatoms.

When, to an amount of this solution equivalent of 2 nickel milliatoms are added, after removal of diethyl ether by evaporation under vacuum, 100 cc. of heptane and 26 g. of butadiene, there are obtained, after stirring of the reactor for 150 minutes at 0° C., 26 g. of polybutadiene whose properties are summarized in the following table:

| | |
|---|---|
| Percent cis-1,4 | 98 |
| Toluene [η] 30° C. | 3.2 |
| Percent gel | Null |
| Percent unsaturation | 98 |
| D+ | 4.5 |

D+ is the distribution of the molecular weights, i.e. the ratio M weight/M number, M weight being determined by diffusion of light and M number by osmometry.

EXAMPLE 4

When, to the equivalent of 0.2 nickel milliatoms of solution A of Example 3, are added, after removal of diethyl ether by evaporation under vacuum, 60 cc. of heptane and 52 g. of butadiene, there are obtained, after stirring of the reactor at 20° C. for 17 hours, 52 g. of polybutadiene exhibiting the same characteristics as the polymer obtained according to Example 3.

We claim:

1. A process for manufacturing a polymerization catalyst which comprises reacting at a temperature of from about −60° C. to about +120° C. dodeca-2,6,10-triene-1,12-diyl nickel with trifluoroacetic acid and molecular oxygen, and thereafter removing the unreacted molecular oxygen and trifluoroacetic acid, the molecular oxygen being added in an effective amount but less than about 2 gram-molecules per gram-atom of nickel and the amount of trifluoroacetic acid being from about 0.5 to about 50 moles per mole of dodeca-2,6,10-triene-1,12-diyl nickel.

2. A process according to claim 1, wherein the reaction between the nickel compound and the molecular oxygen takes place before the reaction with trifluoroacetic acid.

3. A process according to claim 2, wherein the nickel compound and the molecular oxygen are reacted at a temperature from about −60 to about +80° C.

4. A process according to claim 1, wherein the reaction between the nickel compound and the molecular oxygen takes place at the same time as the reaction with trifluoroacetic acid.

5. A process according to claim 1, wherein said nickel compound is reacted with from about 0.05 to 0.9 gram-molecule of molecular oxygen per gram-atom of nickel.

6. A process according to claim 1, wherein said reaction is conducted at a temperature of from about −60° C. to about +80° C.

7. A process according to claim 1, wherein the reaction is continued over a period of from 5 to 60 minutes.

8. A process according to claim 1, wherein from about 1 to 4 moles of trifluoroacetic acid are reacted per mole of said nickel compound.

9. A process according to claim 1, wherein from about 0.5 to 50 moles of trifluoroacetic acid are reacted per mole of said nickel compound.

10. A process according to claim 1, wherein from about 2 to 15 moles of trifluoroacetic acid are reacted per mole of said nickel compound.

11. A process according to claim 1, wherein said nickel compound is reacted with from about 0.4 to 0.6 gram-molecule of molecular oxygen per gram-atom of nickel.

12. A process according to claim 1, wherein said nickel compound is obtained by reacting a zero-valent nickel compound with butadiene used in an amount of 3 to 20 moles per mole of zero-valent nickel compound.

13. A process according to claim 1, wherein the reaction is conducted at a temperature of from about −40 to about +120° C.

14. A process according to claim 13, wherein the reaction temperature is from about −10° C. to +55° C.

15. A process according to claim 1, wherein said effective amount is at least about 0.05 gram-molecules of molecular oxygen per gram-atom of nickel.

16. A process for manufacturing a polymerization catalyst, which comprises reacting at a temperature of from about −60 to about +80° C. dodeca-2,6,10-triene-1,12-diyl nickel with an effective amount of molecular oxygen but less than about 2 gram molecules per gram-atom of nickel, removing unreacted molecular oxygen therefrom, reacting at about −60 to about +120° C. the resulting nickel compound with about 0.5 to about 50 moles of trifluoroacetic acid per mole of dodeca-2,6,10-triene-1,12-diyl nickel, and removing the unreacted trifluoroacetic acid.

17. A process according to claim 16, wherein said effective amount is at least about 0.05 gram-molecule of molecular oxygen per gram-atom of nickel.

18. A process according to claim 16, wherein from about 2 to 15 moles of trifluoroacetic acid are reacted per mole of said nickel compound.

19. A process according to claim 18, wherein from about 1 to 4 moles of trifluoroacetic acid are reacted per mole of said nickel compound.

20. A process according to claim 16, wherein said nickel compound and trifluoroacetic acid are reacted at a temperature of from about −60° C. to +80° C.

21. A process according to claim 20, wherein the reaction temperature is from about −10° C. to +55° C.

22. A process according to claim 16, wherein the reaction is continued over a period of from 5 to 60 minutes.

23. A process for manufacturing a polymerization catalyst which comprises reacting dodeca-2,6,10-triene-1,12-diyl nickel with from about 0.4 to 0.6 gram-molecule of molecular oxygen per gram atom of nickel, removing residual free oxygen from the treated nickel compound, and reacting said treated nickel compound with from about 1 to 4 moles of trifluoroacetic acid per mole of nickel at a temperature of from about −10° C. to about +55° C. for a period of from about 5 to about 60 minutes, then removing the unreacted trifluoroacetic acid.

References Cited

UNITED STATES PATENTS

| 2,525,526 | 10/1950 | Coover et al. | |
| 2,985,673 | 5/1961 | Convery. | |
| 3,432,517 | 3/1969 | Veda et al. | 260—94.3 |

PATRICK P. GARVIN, Primary Examiner

U.S. Cl. X.R.

260—94.3